United States Patent
Akita

(10) Patent No.: US 9,584,228 B2
(45) Date of Patent: Feb. 28, 2017

(54) CLOCK CONTROL CIRCUIT AND TRANSMITTER

(75) Inventor: Hironobu Akita, Chiyoda-ku (JP)

(73) Assignee: THINE ELECTRONICS, INC., Tokyo (JP)

( * ) Notice: Subject to any disclaimer, the term of this patent is extended or adjusted under 35 U.S.C. 154(b) by 1523 days.

(21) Appl. No.: 12/747,807

(22) PCT Filed: Dec. 9, 2009

(86) PCT No.: PCT/JP2009/070606
§ 371 (c)(1),
(2), (4) Date: Jun. 11, 2010

(87) PCT Pub. No.: WO2010/087073
PCT Pub. Date: Aug. 5, 2010

(65) Prior Publication Data
US 2011/0057690 A1     Mar. 10, 2011

(30) Foreign Application Priority Data

Jan. 30, 2009   (JP) .................................. 2009-019923

(51) Int. Cl.
*H04B 15/04*      (2006.01)
(52) U.S. Cl.
CPC ....... *H04B 15/04* (2013.01); *H04B 2215/067* (2013.01)
(58) Field of Classification Search
CPC ..... H04L 7/005; H03H 17/0628; H04B 1/707
(Continued)

(56) References Cited

U.S. PATENT DOCUMENTS 5,736,893 A    4/1998   Puckette et al.
6,240,123 B1 *  5/2001   Zhang et al. ................. 375/130
(Continued)

FOREIGN PATENT DOCUMENTS

JP    9-289527 A    11/1997
JP    11-015550 A    1/1999
(Continued)

OTHER PUBLICATIONS

"1-channel Serial ATA PHY", Atmel Corporation, Jan. 2003, 3 pages.*
(Continued)

*Primary Examiner* — Daniel Washburn
*Assistant Examiner* — Eboni Hughes
(74) *Attorney, Agent, or Firm* — Sughrue Mion, PLLC

(57) ABSTRACT

A transmitter 1 comprises a clock generation portion 4, FIFO portion 6, and serial signal creation portion 7. The clock generation portion 4 performs modulation by spectrum spreading of a reference clock $CK_{ref}$, and generates a first clock $CK_1$ with a high modulation factor and a second clock $CK_2$ with a low modulation factor. The FIFO portion 6 takes as inputs the first clock $CK_1$ which has been output from the clock generation portion 4 to a data generation portion 2 and output from the data generation portion 2, a parallel data signal which has been synchronized with the first clock $CK_1$ in the data generation portion 2 and output, and the second clock $CK_2$ output from the clock generation portion 4, and synchronizes the parallel data signal $P_{data}$ with the second clock $CK_2$ and outputs the parallel data signal $P_{data}$. The serial signal creation portion 7 converts a parallel data signal $PR_{data}$ into a serial data signal $S_{data}$.

16 Claims, 7 Drawing Sheets

(58) Field of Classification Search
USPC .............. 375/130, 131, 140, 141, 354, 376; 713/500, 501, 600
See application file for complete search history.

(56) References Cited

U.S. PATENT DOCUMENTS

| | | | |
|---|---|---|---|
| 6,720,943 B1* | 4/2004 | Lee et al. ..................... | 345/87 |
| 7,446,732 B2* | 11/2008 | Shimizu ................ | G06F 3/1431 |
| | | | 345/3.1 |
| 2006/0165418 A1 | 7/2006 | Park et al. | |
| 2006/0176934 A1* | 8/2006 | Riedel et al. ................. | 375/130 |
| 2010/0164941 A1 | 7/2010 | Chae | |

FOREIGN PATENT DOCUMENTS

| | | | | |
|---|---|---|---|---|
| JP | 2001-007891 A | 1/2001 | | |
| JP | 2006-237723 A | 9/2006 | | |
| KR | WO2002078188 | * 10/2002 | .............. | H03L 7/00 |
| TW | I250395 B | 3/2006 | | |
| TW | I271036 B | 1/2007 | | |

OTHER PUBLICATIONS

European Search Report in European Application No. 09838029.8 dated Jun. 6, 2012.
Taiwanese Office Action dated Apr. 26, 2013 issued in Taiwanese Patent Application No. 099102639.

\* cited by examiner

CLOCK CONTROL CIRCUIT AND TRANSMITTER

TECHNICAL FIELD

This invention relates to a clock control circuit and a transmitter comprising a clock control circuit.

BACKGROUND ART

Communication systems employing high-speed serial transmission are well-known in the prior art. Generally in communication systems, parallel data signals are output from a data generation portion to a transmitter, and in the transmitter the parallel data signals are converted into serial data signals and transmitted to a high-speed serial transmission line. At this time, an operation clock of the transmitter synchronizes parallel data signals from the data generation portion and is transmitted. And, this operation clock is a clock obtained by spread-spectrum (SS) modulation of the frequency of a reference clock in a clock generation portion, and is output to the data generation portion. Such a communication system is for example described in Non-patent Reference 1.

Here, increasing the frequency modulation factor resulting from spread-spectrum modulation of the operation clock is effective for reducing EMI (Electro-Magnetic Interference). Hence in order to lower EMI in communication systems, it is preferable that the modulation factor of the clock generated by the clock generation portion be high.

PRIOR ART DOCUMENT

Non-Patent Document

"1-channel Serial ATA PHY" (online), Atmel Corporation, January 2003 (search of Jan. 21, 2009), Internet: http://www.dzjsw.com/jcdl/a/AT78C5091.pdf

DISCLOSURE OF THE INVENTION

Problem to be Solved by the Invention

In high-speed serial transmission paths, data rates are improved by means of what is called an embedded clock transmission method in which a clock is embedded in serial data signals. In ordinary data communication, spectrum spreading is used to reduce EMI. However, in embedded clock high-speed serial transmission, the modulation factor cannot be made high due to the transmission characteristics. Consequently in the above configuration of the prior art, because the clock used to synchronize serial data signals and the clock used to synchronize parallel data signals are the same, the modulation factor of the clock used to synchronize data in the wire portion between the data generation portion and the transmitter as in other circuit locks must be made low, and so there has been the problem that substantial EMI occurs in these portions.

Hence in order to resolve the above problem, for example between the data generation portion and the transmitter, synchronization of parallel data signals with a clock with a high modulation factor is conceivable; but the new problems of an increase in circuit scale, as well as an increase in power consumption on the transmitter side, occur.

This invention was devised in light of the above problems and has as an object the provision of a clock control circuit, and a transmitter comprising such a circuit, which can reduce EMI by means of a simple configuration.

Means for Solving the Problem

A clock control circuit of this invention comprises a clock generation portion, which performs spectrum spreading of the frequency of a reference clock to generate a first clock with a high modulation factor, and a second clock with a modulation factor lower than the first clock, and which outputs the generated first clock and second clock; and a FIFO portion, which takes as inputs the first clock output from the clock generation portion to an external circuit and output from the external circuit, a parallel data signal synchronized with the first clock in the external circuit and output, and the second clock output from the clock generation portion, and which synchronizes the parallel data signal with the second clock and outputs the resulting parallel data signal.

In this clock control circuit, by performing spectrum spreading of the frequency of the same reference clock, a second clock with a modulation factor lower than that of a first clock with a high modulation factor is generated by the clock generation portion, and is output to the FIFO portion. At this time, the first clock is output to an external circuit, and in this external circuit synchronization of parallel data signals is performed, followed by output to the FIFO portion. And, in the FIFO portion, in place of the first clock used to synchronize the parallel data signal, the parallel data signals are synchronized with the second clock and output. By this means, when transmitting parallel data signals, upon synchronization with a clock with a high modulation factor and conversion of the parallel data signals to serial data signals for high-speed serial transmission, synchronization with a clock with a low modulation factor is possible. Hence EMI can be reduced in a wiring portion in which parallel data signals are transmitted, such as for example between an external circuit (data generation portion) and a transmitter, or in other circuit blocks. Further, a circuit for synchronization of parallel data signals with a clock with a high modulation factor between an external circuit and a transmitter is not necessary, so that a simple configuration can be employed.

Further, it is preferable that a clock generation portion be arranged at a position closer to the FIFO portion than the external circuit. In this case, the transmission path (transmission line) connecting the clock generation portion and the FIFO portion is short, so that when the second clock with a low modulation factor is transmitted from the clock generation portion to the FIFO portion, EMI can be reduced. At this time, even in cases in which the external circuit exists at a position distant from the clock generation portion, the modulation factor of the first clock is high, and so the EMI is reduced.

Further, a clock generation portion has a first clock generation portion which generates a first clock, and a second clock generation portion which generates a second clock; it is preferable that the clock generation portion further have a phase adjustment circuit, which generates a first control signal and second control signal to match the phases of the first clock and the second clock, and outputs the generated first control signal to the first clock generation portion and outputs the generated second control signal to the second clock generation portion. In this case, based on the first control signal and second control signal to match the phases, the first clock and second clock are each generated, and so the phase difference between the first clock and the second clock can be made small. Hence the difference between the data rates of the first clock and the second clock (the clock frequencies) can be made small, and the number of registers in the FIFO portion can be reduced.

Further, it is preferable that the clock generation portion have a frequency division circuit, which takes the first clock as an input, divides the frequency of the first clock, and outputs the result. In this case, the desired first clock frequency can be obtained.

Further, it is preferable that the clock generation portion have a frequency division circuit, which takes the first clock as an input, divides the frequency of the first clock, and outputs the result. In this case, the desired first clock frequency can be obtained.

A transmitter of this invention comprises a clock generation portion, which performs spectrum spreading of the frequency of a reference clock to generate a first clock with a high modulation factor, and a second clock with a modulation factor lower than the first clock, and which outputs the generated first clock and second clock; a FIFO portion, which takes as inputs the first clock output from the clock generation portion to an external circuit and output from the external circuit, a parallel data signal synchronized with the first clock in the external circuit and output, and the second clock output from the clock generation portion, and which synchronizes the parallel data signal with the second clock and outputs the resulting parallel data signal; and a serial transmission signal creation portion, which takes as input the parallel data signal synchronized with the second clock and output from the FIFO portion, and converts the parallel data signal to a serial data signal and outputs the serial data signal.

In this transmitter, by performing spectrum spreading of the frequency of the same reference clock, a first clock with a high modulation factor and a second clock with a low modulation factor are generated by the clock generation portion, and are output to the FIFO portion. At this time, the first clock is output to an external circuit, and after synchronizing parallel data signals in the external circuit, is output to the FIFO portion. And, in the FIFO portion, instead of the first clock used to synchronize the parallel data signals, the parallel data signals are synchronized with the second clock and output, and in the serial transmission signal creation portion to which the parallel data signals have been input, the parallel data signals are converted into serial data signals and output. By this means, when transmitting parallel data signals, synchronization employs a clock with a high modulation factor, and when the parallel data signals are converted into serial data signals and used in high-speed serial transmission, the signals can be synchronized with a clock with a low modulation factor. Hence the high EMI in for example the wire portion with the external circuit (data generation portion) over which parallel data signals are transmitted, and in other circuit blocks, can be reduced. Further, a circuit for synchronization of parallel data signals with a clock with a high modulation factor between an external circuit and the transmitter is not necessary, so that a simple configuration can be employed.

Effect of the Invention

By means of this invention, EMI can be reduced using a simple configuration.

BEST MODE FOR CARRYING OUT THE INVENTION

Below, embodiments of the invention are explained in detail, referring to the attached drawings. In the explanations of the drawings, the same symbols are assigned to the same elements, and redundant explanations are omitted.

Figure 1:
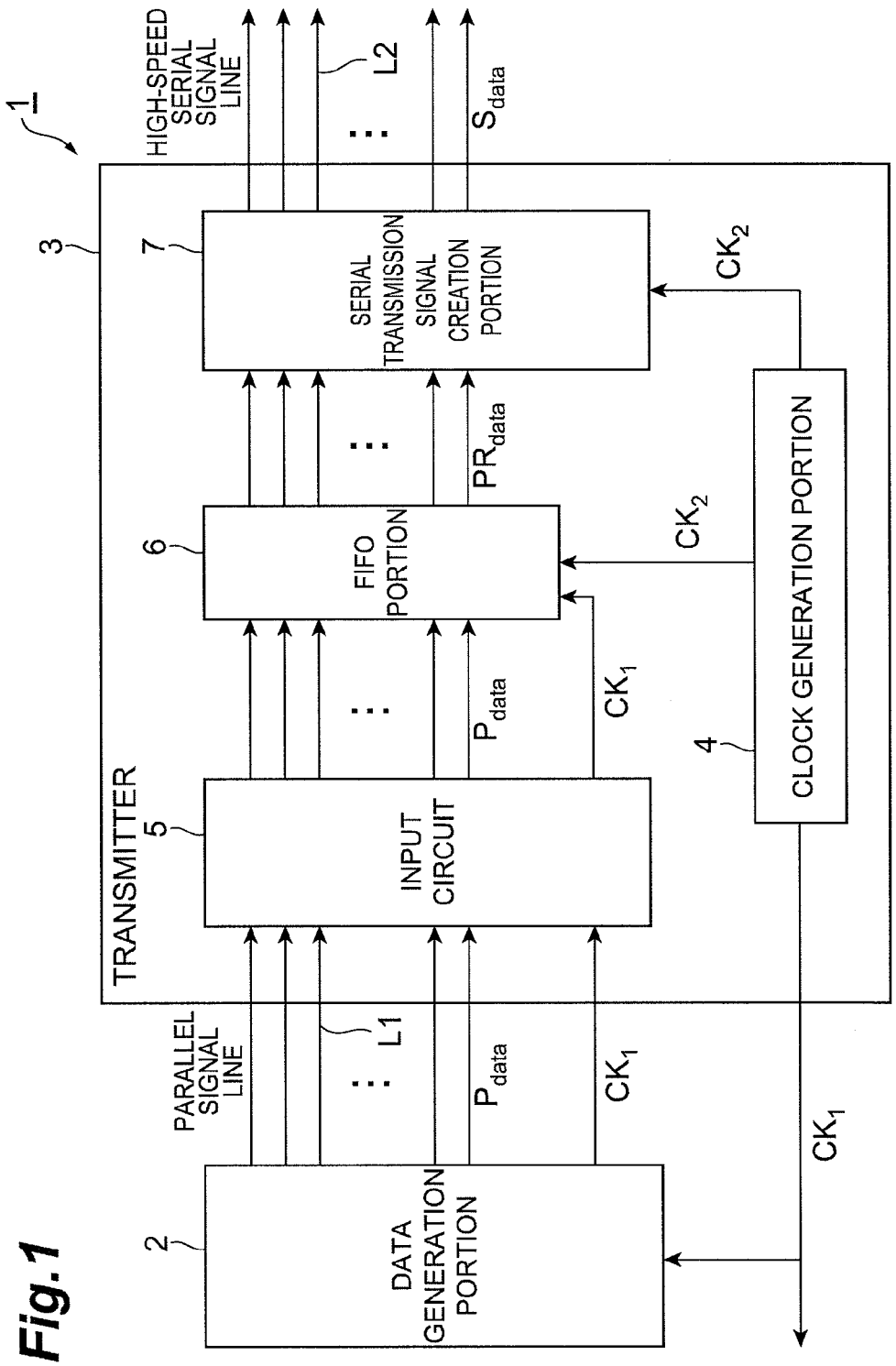
FIG. 1 is a configuration diagram of a communication system including the transmitter of an embodiment.

FIG. 1 is a configuration diagram of a communication system including the transmitter of an embodiment. The communication system 1 shown in this figure comprises a data generation portion 2 and a transmitter 3. The data generation portion 2 and transmitter 3 are connected by a low-speed parallel signal line L1. Further, the transmitter 3 is connected to one end of a high-speed serial transmission line L2; the other end is connected to for example a receiver (not shown). In FIG. 1, the transmitter 3 and the data generation portion 2 are both formed by LSIs, and the parallel signal line L1 and high-speed serial transmission line L2 connecting these are cables and wires on a PCB (Printed Circuit Board).

The data generation portion 2 takes as input a first clock $CK_1$ (described below) output from the transmitter 3, synchronizes the parallel data signals $P_{data}$ to be transmitted with this first clock $CK_1$, and outputs the parallel data signals $P_{data}$ and the first clock $CK_1$ to the transmitter 3. This data generation portion 2 is an external circuit. Here, "external" means functionally separated from the transmitter 3 in cases in which blocks are divided into functional elements.

The transmitter 3 comprises a clock generation portion 4, input circuit 5, FIFO portion 6, and serial transmission signal creation portion 7. The clock generation portion 4 is positioned close to the FIFO portion 6 and serial transmission signal creation portion 7 within the transmitter 3. This transmitter 3 is an apparatus which transmits, for example, video (image) data to a receiver. The clock generation portion 4 and FIFO portion 6 function as data transfer circuits between two clocks with different spectrum spreading amounts (clock control circuits).

Figure 2:
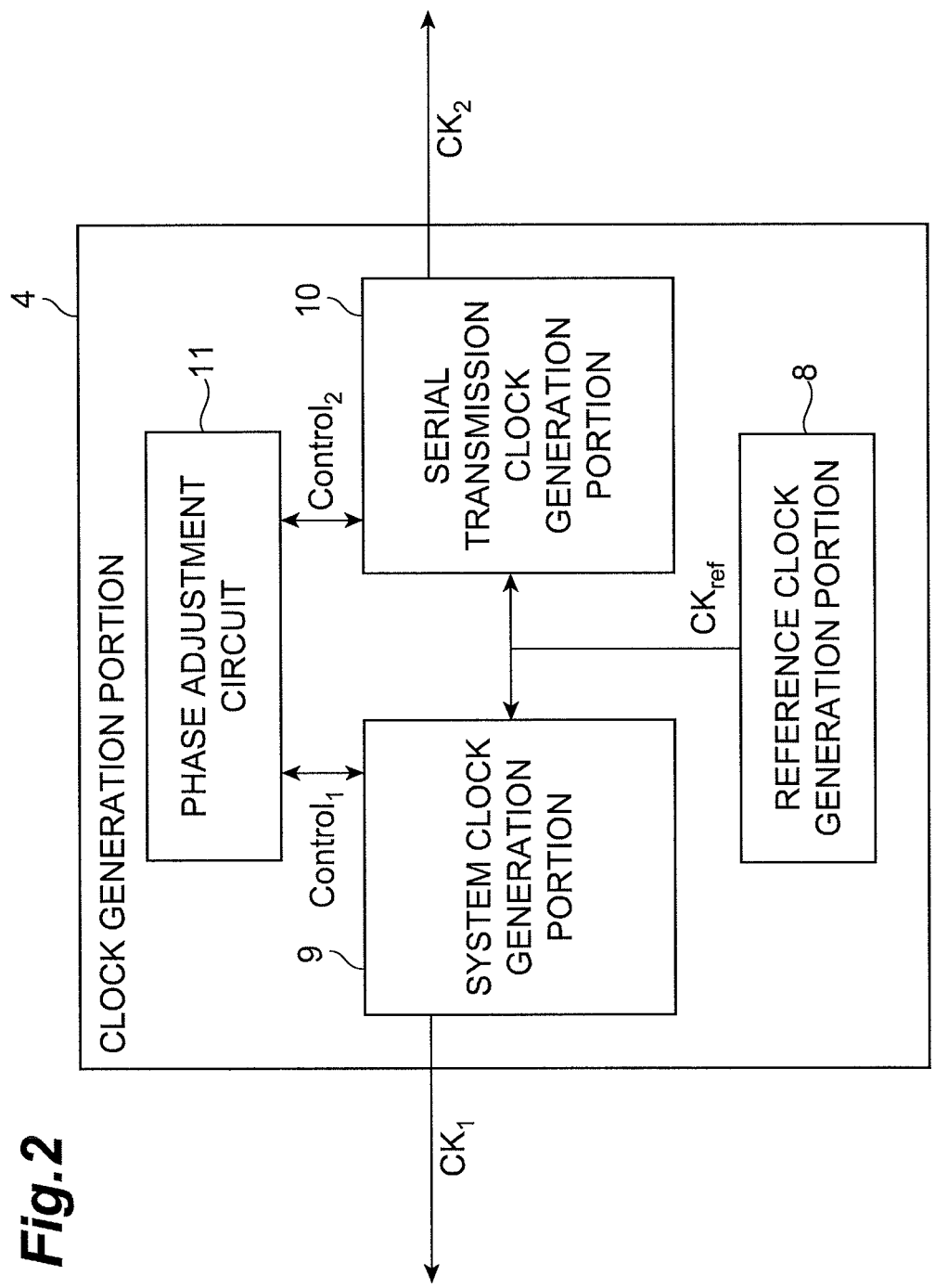
FIG. 2 is a configuration diagram of a clock generation portion.

The clock generation portion 4 is explained referring to FIG. 2. FIG. 2 is a configuration diagram of the clock generation portion 4. As shown in the figure, the clock generation portion 4 comprises a reference clock generation portion 8, system clock generation portion (first clock generation portion) 9, serial transmission clock generation portion (second clock generation portion) 10, and phase adjustment circuit 11.

The reference clock generation portion 8 generates a reference clock $CK_{ref}$ with a prescribed frequency. The reference clock generation portion 8 outputs the generated reference clock $CK_{ref}$ to the system clock generation portion 9 and to the serial transmission clock generation portion 10.

The system clock generation portion 9 takes as input the reference clock $CK_{ref}$ output from the reference clock generation portion 8, and based on this reference clock $CK_{ref}$, generates and outputs a first clock $CK_1$, which is a system clock. Specifically, the system clock generation portion 9 takes as input a first control signal $Control_1$ (described below) output from the phase adjustment circuit 11, and based on this first control signal $Control_1$, performs modulation by spectrum spreading (SS) of the frequency of the reference clock $CK_{ref}$, generating the first clock $CK_1$ with high frequency modulation factor (modulation width), and outputs this first clock $CK_1$ to the data generation portion 2. The first clock $CK_1$ may be output to other circuit blocks as well.

The serial transmission clock generation portion 10 takes as input the reference clock $CK_{ref}$ output from the reference clock generation portion 8, and based on this reference clock $CK_{ref}$, generates a second clock $CK_2$ which is a serial transmission clock. Specifically, the serial transmission clock generation portion 10 takes as input a second control signal $Control_2$ (described below) output from the phase adjustment circuit 11, and based on this second control signal $Control_2$, performs modulation by spectrum spreading (SS) of the frequency of the reference clock $CK_{ref}$, generating the second clock $CK_2$ with low frequency modulation factor (modulation width), and outputs this second clock $CK_2$ to the FIFO portion 6 and to the serial transmission signal creation portion 7. The frequency modulation factor for this second clock $CK_2$ is set lower than for the first clock $CK_1$, and is a frequency modulation factor enabling transmission in the high-speed serial transmission line L2.

The serial transmission clock generation portion 10 may generate and output the second clock $CK_2$ with the modulation factor for spectrum spreading of the reference clock $CK_{ref}$ set to 0. In this case, the serial transmission clock generation portion 10 outputs to the phase adjustment circuit 11 a stop signal to stop operation of the phase adjustment circuit 11, described below.

The phase adjustment circuit 11 adjusts the phase between the first clock $CK_1$ and the second clock $CK_2$. Specifically, the phase adjustment circuit 11 detects the first clock $CK_1$ and second clock $CK_2$, generates a first control signal $Control_1$ and a second control signals $Control_2$ different from the first control signal $Control_1$ in order to match the phases of the first clock $CK_1$ and second clock $CK_2$, and outputs the first control signal $Control_1$ to the system clock generation portion 9 and outputs the second control signal $Control_2$ to the serial transmission clock generation portion 10, respectively.

Returning to FIG. 1, the input circuit 5 is for example a latch circuit, which takes as inputs the first clock $CK_1$ which has been output from the clock generation portion 4 to the data generation portion 2 and output from this data generation portion 2, and the parallel data signal $P_{data}$ which has been synchronized with the first clock $CK_1$ in the data generation portion 2 and output; the parallel data signal $P_{data}$ and first clock $CK_1$ are output to the FIFO portion 6. The input circuit 5 is for example an external circuit positioned outside the boundary portion of the LSI, and is configured so as to be able to withstand ESD (Electrostatic Discharge) and similar.

The FIFO portion 6 performs transfer of the parallel data signal $P_{data}$ from the first clock $CK_1$ to the second clock $CK_2$. Specifically, the FIFO portion 6 takes as inputs the first clock $CK_1$ and parallel data signal $P_{data}$ output from the external circuit 5 and the second clock $CK_2$ output from the clock generation portion 4. And, the FIFO portion 6 synchronizes the input parallel data signal $P_{data}$ with the second clock $CK_2$, and outputs the result as a parallel data signal $PR_{data}$ to the serial transmission signal creation portion 7. Further, the FIFO portion 6 prevents overflow and underflow due to the instantaneous difference in data rates (frequencies) occurring due to the different modulation factors of the first clock $CK_1$ and second clock $CK_2$.

The serial transmission signal creation portion 7 takes as inputs the parallel data signal $PR_{data}$ synchronized with the second clock $CK_2$ and output from the FIFO portion 6, and the second clock $CK_2$ output from the serial transmission clock generation portion 10, converts the parallel data signal $PR_{data}$ into a serial data signal $S_{data}$ according to the second clock $CK_2$, and outputs this serial data signal $S_{data}$ to the high-speed serial transmission line L2.

Figure 3:
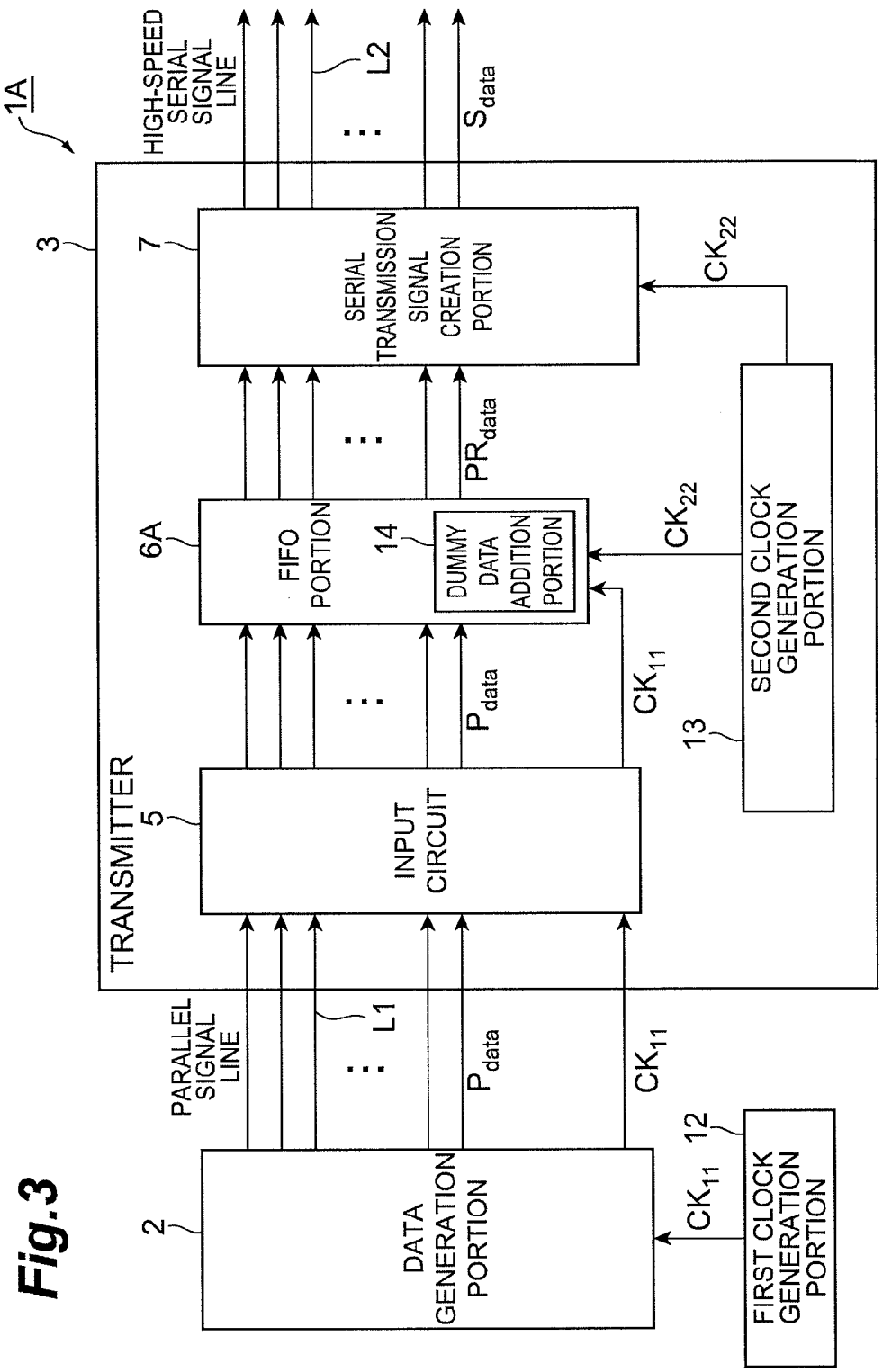
FIG. 3 is a configuration diagram of the communication system of a comparison example.

Next, the communication system of a comparison example is explained. FIG. 3 is a configuration diagram showing the communication system of the comparison example. As shown in the figure, the communication system 1A of the comparison example is applied to a display port, and differs from the communication system 1 of the embodiment in comprising a first clock generation portion 12 and a second clock generation portion 13. Below, the communication system 1A of the comparison example is explained.

The first clock generation portion 12 performs spectrum spreading of the frequency of a reference clock to generate a first clock $CK_{11}$ with a high modulation factor, and outputs this first clock $CK_{11}$ to a data generation portion 2. Further, the second clock generation portion 13 performs spectrum spreading of the frequency of a reference clock different from the reference clock of the first clock generation portion 12 to generate a second clock $CK_{22}$ with a low modulation factor. This second clock $CK_{22}$ is output to a FIFO portion 6A and a serial transmission signal creation portion 7.

In the communication system 1A having the above configuration, the first clock $CK_{11}$ with a high modulation factor is output from the first clock generation portion 12 to the data generation portion 2, and the second clock $CK_{22}$ with a low modulation factor is output from the second clock generation portion 13 to the FIFO portion 6A, so that the parallel data signal $P_{data}$ is synchronized with the first clock $CK_{11}$ with a high modulation factor and output from the data generation portion 2 to the transmitter 3, and by this means EMI is reduced in the parallel signal line L1 and similar. Further, the frequency of the second clock $CK_{22}$ is made sufficiently higher than the frequency of the first clock $CK_{11}$, and surpassing and overlapping of data output from the FIFO portion 6A by data input to the FIFO portion 6A is prevented. However, the increase in frequency is accompanied by a higher data rate for the second clock $CK_{22}$ output from the FIFO portion 6A than the data rate of the first clock $CK_{11}$ input to the FIFO portion 6A, and the problem of underflow occurs.

Hence in the communication system 1A, the FIFO portion 6A has a dummy data addition portion 14. This dummy data addition portion 14 adds dummy Fill data according to the data rate. Action of the dummy data addition portion 14 is explained referring to FIG. 4.

Figure 4:
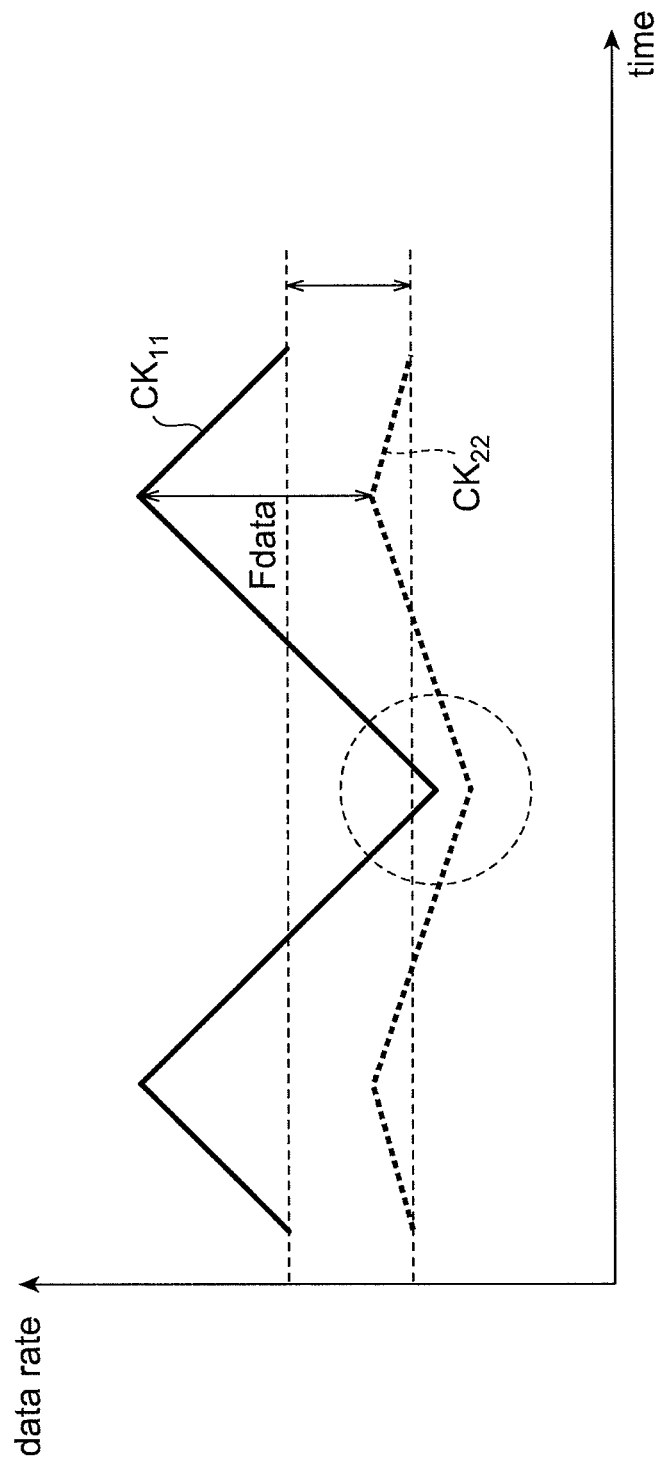
FIG. 4 shows the proportional change in the data rates of the first clock and second clock in the communication system of a comparison example.

FIG. 4 shows the proportional change in the data rates of the first clock $CK_{11}$ and second clock $CK_{22}$ in the communication system 1A. In the figure, the solid line shows the first clock $CK_{11}$, and the dashed line shows the second clock $CK_{22}$. As shown in FIG. 4, the modulation factor of the first clock $CK_{11}$ is higher than the modulation factor of the second clock $CK_{22}$. And, in order that data overflow not occur in the portion surrounded by a dashed line, the average data rate of the first clock $CK_{11}$ is set to a value sufficiently higher than the average data rate of the second clock $CK_{22}$. At this time, the dummy data addition portion 14 adds Fill data $F_{data}$ indicated by the arrow according to the difference in data rates of the first clock $CK_{11}$ and second clock $CK_{22}$, in order to prevent underflow, and augments the difference in data rates.

However, in the above communication system 1A, the first clock generation portion 12 and second clock generation portion 13 operate independently, so that the phases of the frequencies modulated by spectrum spreading are not necessarily the same, and there are cases in which the phases are different. At these times, the difference in the data rates of the first clock $CK_{11}$ and second clock $CK_{22}$ must be made still larger. And when realizing such operation, there is the problem that the circuit scale increases.

Figure 5:
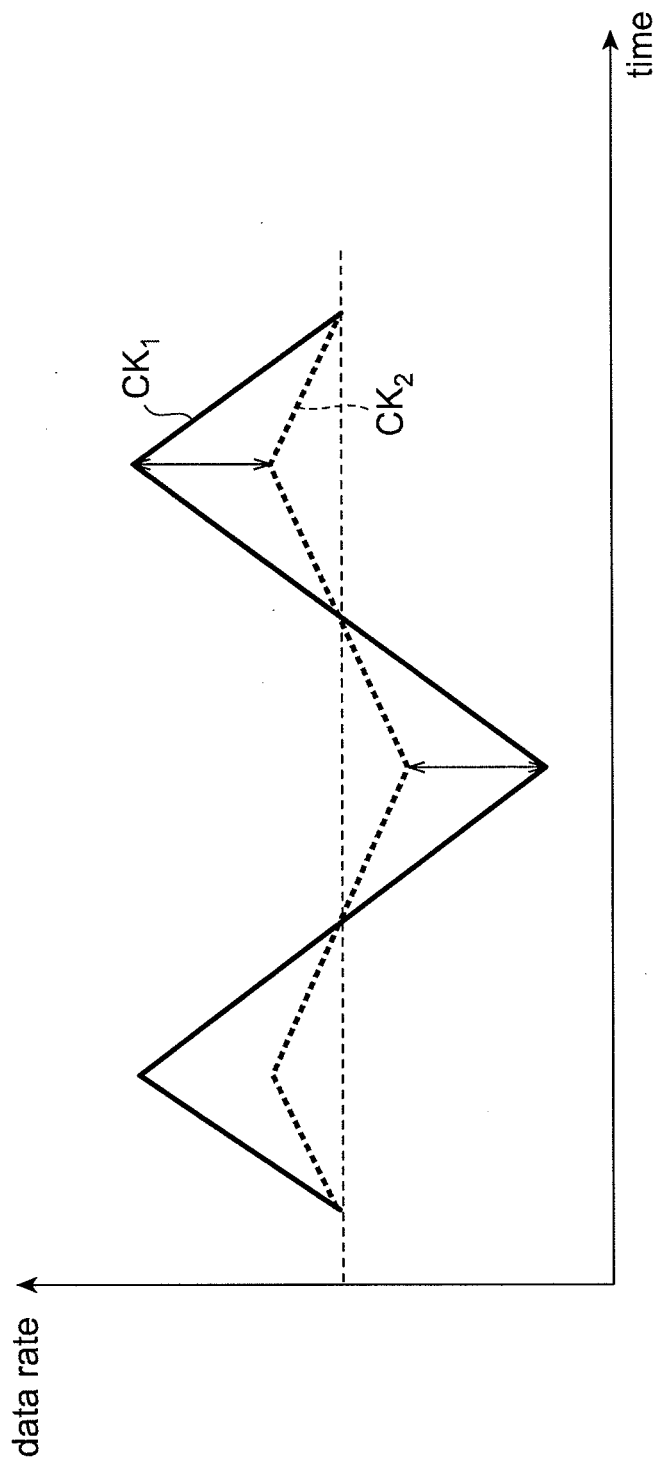
FIG. 5 shows the proportional change in the data rates of the first clock and second clock in the communication system of an embodiment.

On the other hand, in the communication system 1 of the embodiment, the first clock $CK_1$ and second clock $CK_2$ are generated from the same reference clock $CK_{ref}$ in the clock generation portion 4. Hence as shown in FIG. 5, the modulation factor of the first clock $CK_1$ can be made high and the modulation factor of the second clock $CK_2$ can be made low, and in addition the average data rates of the first clock $CK_1$ and second clock $CK_2$ can be made equal. Consequently there is no need to add Fill data $F_{data}$ according to the difference in data rates, so that the dummy data addition portion 14 is unnecessary, and the circuit configuration can be the smallest possible.

Further, even when the instantaneous data rates of the first clock $CK_1$ and second clock $CK_2$ are different, by performing adjustment using the FIFO portion 6 such that data in the overflow portion becomes the underflow portion as shown in FIG. 5, data rate overflow and underflow can be prevented. In this way, in the communication system 1 of this embodiment, underflow and overflow can be prevented by a simple configuration compared with the communication system 1A of the comparison example. Further, the average data rates of the first clock $CK_1$ and second clock $CK_2$ are equal, so that the serial transmission signal creation portion 7 need only operate at the minimum required operation speed, increases in circuit scale can be suppressed, and increases in power consumption can be prevented.

In the above, in the communication system 1 comprising the transmitter 3 of the embodiment, by performing spectrum spreading of the frequency of the same reference clock $CK_{ref}$, a first clock $CK_1$ with a high modulation factor and a second clock $CK_2$ with a low modulation factor are generated by the clock generation portion 4, and are output to the FIFO portion 6. At this time, the first clock $CK_1$ is output to the data generation portion 2, and after synchronizing the parallel data signal $P_{data}$ in the data generation portion 2, is output to the FIFO portion 6. And, in the FIFO portion 6, instead of the first clock $CK_1$ used to synchronize the parallel data signal $P_{data}$, the parallel data signal $P_{data}$ is synchronized with the second clock $CK_2$ and output.

By this means, when transmitting the parallel data signal $P_{data}$, synchronization with the first clock $CK_1$ with a high modulation factor is performed, and when converting the parallel data signal $PR_{data}$ into a serial data signal $S_{data}$ and performing high-speed serial transmission, synchronization with the second clock $CK_2$ with a low modulation factor is possible. Hence it is possible to reduce the strong EMI in for example the wire portion between the data generation portion 2 and transmitter 3 in which the parallel data signal $P_{data}$ is transmitted, and in other circuit blocks.

Further, the clock generation portion 4 is arranged at a position closer to the FIFO portion 6 than the data generation portion 2, so that the transmission line connecting the clock generation portion 4 and FIFO portion 6 is shortened, and EMI can be reduced when the second clock $CK_2$ with a low modulation factor is transmitted to the FIFO portion 6. At this time, the data generation portion 2 exists at a position distant from the clock generation portion 4, but because the modulation factor of the first clock $CK_1$ is high, EMI is reduced.

Further, by means of the phase adjustment circuit 11, adjustment is performed such that the frequency modulated phases of the first clock $CK_1$ and second clock $CK_2$ are equal, so that the phase difference between the first clock $CK_1$ and second clock $CK_2$ is made small, and the difference in data rates (clock frequencies) of the first clock $CK_1$ and second clock $CK_2$ can be made small. By this means, data rate adjustment processing in the FIFO portion 6 can be alleviated.

Figure 6:
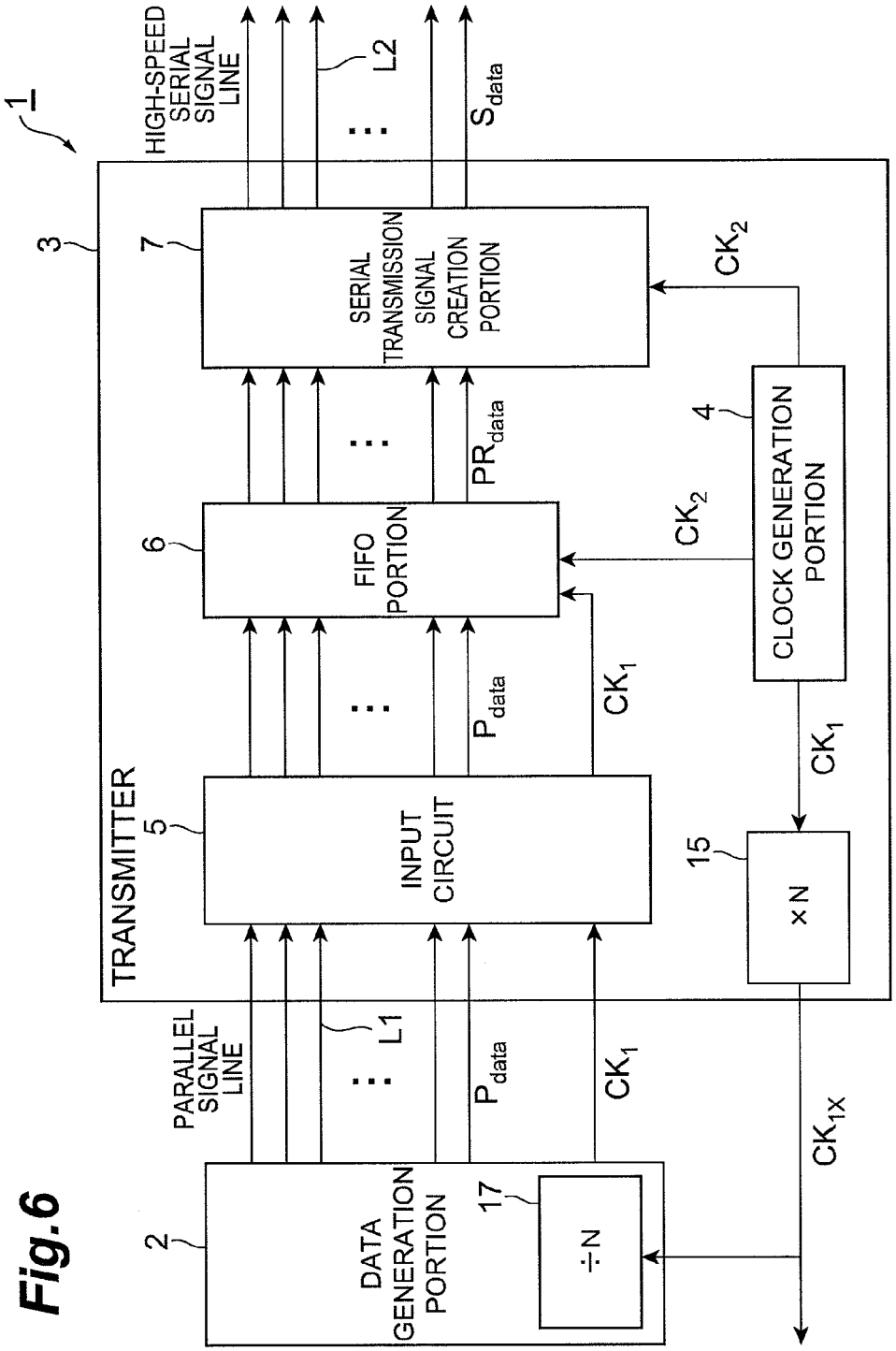
FIG. 6 is a configuration diagram of the communication system of a modified example.
Figure 7:
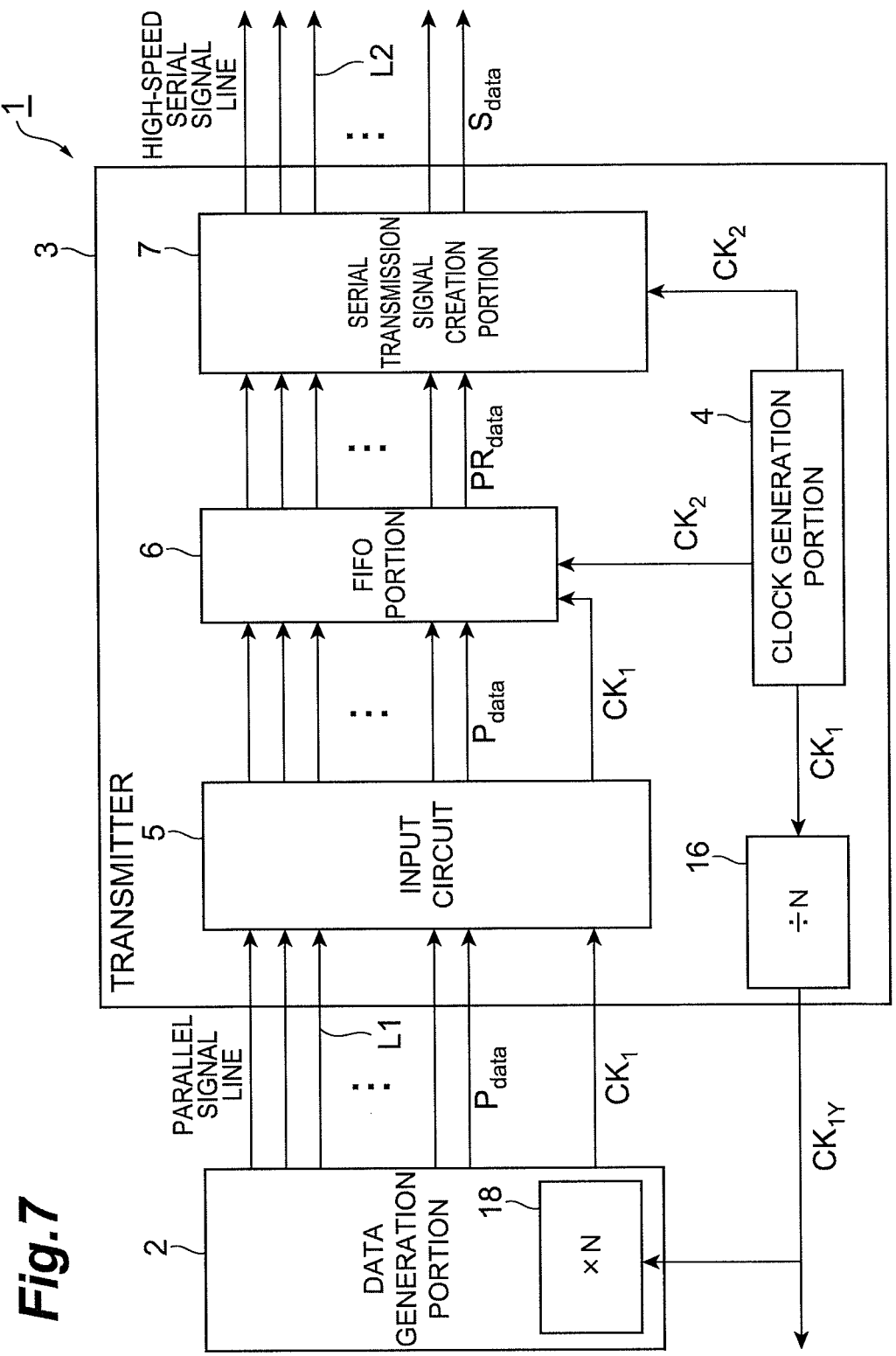
FIG. 7 is a configuration diagram of the communication system of a modified example.

This invention is not limited to the above embodiment. For example, in the embodiment, the first clock $CK_1$ generated in the system clock generation portion 9 is output from the data generation portion 2 at the same frequency; but as shown in FIG. 6, a multiplier circuit 15 which multiples (×N) the first clock $CK_1$ may be provided between the system clock generation portion 9 and the data generation portion 2, in a configuration in which a first clock $CK_{1X}$ at a desired frequency is obtained. Corresponding to this multiplier circuit 15, a divider circuit 17 which divides the frequency the first clock $CK_{1X}$ may be provided in the data generation portion 2. Further, as shown in FIG. 7, a divider circuit 16 (÷N) which divides the frequency the first clock $CK_1$ may be provided between the system clock generation portion 9 and the data generation portion 2, and corresponding to the first clock $CK_{1Y}$ output from this divider circuit 16, a multiplier circuit 18 which multiplies this first clock $CK_{1Y}$ may be provided in the data generation portion 2. In short, it is sufficient that the average data rates of the first clock $CK_1$ and second clock $CK_2$ in the FIFO portion 6 be equal.

Further, in the above embodiment, the phase adjustment circuit 11 outputs a first control signal $Control_1$ to the system clock generation portion 9 and outputs a second control signal $Control_2$ to the serial transmission clock generation portion 10 respectively, and performs adjustment such that the frequency modulated phases of the first clock $CK_1$ and second clock $CK_2$ are equal; but phase adjustment is not limited to the above method. For example, the phase adjustment circuit 11 may takes as inputs the first clock $CK_1$ and second clock $CK_2$ and detect the phase difference, perform adjustment based on this phase difference so that the frequency modulated phases are equal, and output the phase-adjusted first clock $CK_1$ and second clock $CK_2$.

Further, in the above embodiment, a modulation method was described in which, in FIG. 4 and FIG. 5, the proportional changes in data rates of the first clock $CK_1$ (first clock $CK_{11}$) and second clock $CK_2$ (second clock $CK_{22}$) are sawtooth waves; but a modulation method using for example sine waves may also be employed.

Further, in the above embodiment, the data generation portion 2 and transmitter 3 are each comprised by LSIs; but other configurations may be used. For example, a single LSI including both the data generation portion 2 and transmitter 3 may be employed, or the data generation portion 2 and transmitter 3 may be macro circuits. Further, the data generation portion 2, clock control circuits (clock generation portion 4 and FIFO portion 6), and serial transmission signal creation portion 7 may each be comprised by LSIs, and the data generation portion 2, clock generation portion 4, serial transmission signal creation portion 7, and other portions may each be comprised by LSIs.

INDUSTRIAL APPLICABILITY

This invention can be used in applications to reduce EMI by means of a simple configuration.

EXPLANATION OF REFERENCE NUMERALS

2 Data generation portion (external circuit)
3 Transmitter
4 Clock generation portion
6 FIFO portion
7 Serial transmission signal creation portion
9 System clock generation portion (first clock generation portion)
10 Serial transmission clock generation portion (second clock generation portion)
11 Phase adjustment circuit
15 Multiplier circuit
16 Divider circuit
$CK_{ref}$ Reference clock
$CK_1$ First clock
$CK_2$ Second clock
$Control_1$ First control signal
$Control_2$ Second control signal
$P_{data}$, $PR_{data}$ Parallel data signal
$S_{data}$ Serial data signal

The invention claimed is:

1. A clock control circuit, comprising:
   a clock generation portion:
      configured to perform spectrum spreading of the frequency of a reference clock to generate:
         a first clock with a high modulation factor and
         a second clock with a modulation factor lower than the first clock; and
      configured to output the generated first clock and second clock, the first clock being output to an external circuit configured to synchronize a parallel data signal with the first clock; and
   a FIFO portion:
      configured to receive:
         the first clock,
         the second clock, and
         the parallel data signal that is synchronized with the first clock;
      configured to synchronize the parallel data signal with the second clock; and
      configured to output the resulting parallel data signal.

2. The clock control circuit according to claim 1, wherein the clock generation portion is arranged at a position closer to the FIFO portion than the external circuit.

3. The clock control circuit according to claim 1, wherein the clock generation portion comprises:
   a first clock generation portion configured to generate the first clock,
   a second clock generation portion configured to generate the second clock, and
   a phase adjustment circuit:
      configured to generate:
         a first control signal and
         a second control signal to match the phases of the first clock and the second clock;
      configured to output the generated first control signal to the first clock generation portion; and
      configured to output the generated second control signal to the second clock generation portion.

4. The clock control circuit according to claim 1, wherein the clock generation portion comprises:
   a multiplier circuit:
      configured to receive as input the first clock,
      configured to multiply the first clock; and
      configured to output the resulting first clock.

5. The clock control circuit according to claim 1 wherein the clock generation portion comprises:
   a divider circuit:
      configured to receive as input the first clock;
      configured to divide the frequency of the first clock; and
      configured to output the resulting first clock.

6. A transmitter, comprising:
   a clock generation portion:
      configured to perform spectrum spreading of the frequency of a reference clock to generate:
         a first clock with a high modulation factor and
         a second clock with a modulation factor lower than the first clock; and
      configured to output the generated first clock and second clock, the first clock being output to an external circuit configured to synchronize a parallel data signal with the first clock; and
   a FIFO portion:
      configured to receive:
         the first clock,
         the second clock, and
         the parallel data signal that is synchronized with the first clock;
      configured to synchronize the parallel data signal with the second clock; and
      configured to output the resulting parallel data signal; and
   a serial transmission signal creation portion:
      configured to receive the parallel data signal synchronized with the second clock;
      configured to convert the parallel data signal to a serial data signal; and
      configured to output the serial data signal.

7. The clock control circuit according to claim 3, wherein the clock generation portion further comprises:
   a multiplier circuit:
      configured to receive as input the first clock;
      configured to multiply the first clock; and
      configured to output the resulting first clock.

8. The clock control circuit according to claim 3, wherein the clock generation portion further comprises:
   a divider circuit:
      configured to receive as input the first clock;
      configured to divide the frequency of the first clock; and
      configured to output the resulting first clock.

9. The clock control circuit according to claim 4, wherein the clock generation portion further comprises:
   a divider circuit:
      configured to receive as input the first clock;
      configured to divide the frequency of the first clock; and
      configured to output the resulting first clock.

10. The clock control circuit according to claim 7, wherein the clock generation portion further comprises:
    a divider circuit:
       configured to receive as input the first clock;
       configured to divide the frequency of the first clock; and
       configured to output the resulting first clock.

11. The clock control circuit according to claim 2, wherein the clock generation portion comprises:
   a first clock generation portion configured to generate the first clock,
   a second clock generation portion configured to generate the second clock, and
   a phase adjustment circuit:
      configured to generate:
         a first control signal and
         a second control signal to match the phases of the first clock and the second clock;
      configured to output the generated first control signal to the first clock generation portion; and
      configured to output the generated second control signal to the second clock generation portion.

12. The clock control circuit according to claim 2, wherein the clock generation portion comprises:
   a multiplier circuit:
      configured to receive as input the first clock;
      configured to multiply the first clock; and
      configured to output the resulting first clock.

13. The clock control circuit according to claim 2, wherein the clock generation portion comprises:
   a divider circuit:
      configured to receive as input the first clock;
      configured to divide the frequency of the first clock; and
      configured to output the resulting first clock.

14. A clock control circuit, comprising:
   a clock generation portion:
      configured to generate:
         a first clock with a high modulation factor and
         a second clock with a modulation factor lower than the first clock, by spectrum spreading the frequency of a reference clock; and
   a FIFO portion:
      configured to
      receive as inputs:
         (i) the first clock from an external circuit that receives the first clock from the clock generation portion,
         (ii) a parallel data signal synchronized with the first clock in the external circuit, and
         (iii) the second clock output from the clock generation portion; and
      configured to synchronize the parallel data signal with the second clock, and
      configured to output the resulting parallel data signal.

15. The clock control circuit according to claim 1, wherein the clock generation portion comprises:
   a phase adjustment circuit configured to generate a first control signal and a second control signal to match the phases of the first clock and the second clock, respectively.

16. The clock control circuit according to claim 15, wherein the first control signal and the second control signal are different.

* * * * *